United States Patent (10) Patent No.: US 9,097,367 B2
Lohmann (45) Date of Patent: Aug. 4, 2015

(54) DUCTWORK

(75) Inventor: Hans Lohmann, Sorø (DK)

(73) Assignee: Blücher Metal A/S, Vildbjer (DK)

( * ) Notice: Subject to any disclaimer, the term of this patent is extended or adjusted under 35 U.S.C. 154(b) by 52 days.

(21) Appl. No.: 13/883,112

(22) PCT Filed: Nov. 2, 2011

(86) PCT No.: PCT/DK2011/050413
§ 371 (c)(1),
(2), (4) Date: May 2, 2013

(87) PCT Pub. No.: WO2012/059106
PCT Pub. Date: May 10, 2012

(65) Prior Publication Data
US 2013/0212833 A1 Aug. 22, 2013

(30) Foreign Application Priority Data

Nov. 2, 2010 (DK) .................................. 2010 70470
Feb. 8, 2011 (DK) .................................. 2011 70071

(51) Int. Cl.
F16L 5/08 (2006.01)
B63B 13/00 (2006.01)
F16L 5/02 (2006.01)
F16B 13/08 (2006.01)
F16B 37/06 (2006.01)

(52) U.S. Cl.
CPC . F16L 5/08 (2013.01); B63B 13/00 (2013.01); F16L 5/025 (2013.01); F16B 13/0833 (2013.01); F16B 13/0891 (2013.01); F16B 37/067 (2013.01); Y10T 16/05 (2015.01)

(58) Field of Classification Search
USPC .......... 285/139.1, 139.2, 139.3, 140.1, 141.1, 285/210, 209, 208
See application file for complete search history.

(56) References Cited

U.S. PATENT DOCUMENTS

| 620,484 | A | * | 2/1899 | Mueller | 285/210 |
| 3,173,227 | A | * | 3/1965 | Clark | 285/210 |
| 3,322,442 | A | * | 5/1967 | Flachbarth | 285/208 |

(Continued)

FOREIGN PATENT DOCUMENTS

CN 1210218 A 3/1999
DE 198 28 211 A1 1/1999

(Continued)

Primary Examiner — David E Bochna
(74) Attorney, Agent, or Firm — Robert Mlotkowski; Safran & Cole, P.C.; David S. Safran

(57) ABSTRACT

Ductwork, for arranging at least one pipe through an opening in a partitioning, has a flange with a central area having a guide opening for every pipe, the flange having plural mounting apertures, an inner side of the flange being adapted for bearing against a side of the partitioning. The ductwork also has a connecting arrangement mounted in each mounting aperture and has a force transmitter with an operating member disposed over an outer side of the flange. A shank extends through the mounting aperture, over which a clamping device is displaceable around and/or along the shank by actuating the operating member. An engagement arrangement disposed between the inner side of the flange and the clamping device has contact surfaces interacting with contact surfaces on the clamping device, and engaging faces that are displaceable radially relative to the shank by the operating member.

8 Claims, 8 Drawing Sheets

(56) References Cited

U.S. PATENT DOCUMENTS

| | | | | |
|---|---|---|---|---|
| 3,563,269 | A | * | 2/1971 | Sarsfield ................ 285/208 |
| 3,643,987 | A | | 2/1972 | DuPont |
| 3,841,673 | A | * | 10/1974 | Kohaut ................ 285/210 |
| 4,023,833 | A | * | 5/1977 | Wellard ................ 285/210 |
| 5,810,400 | A | | 9/1998 | Youngs |
| 5,901,985 | A | * | 5/1999 | Raatz ................ 285/210 |
| 6,179,344 | B1 | * | 1/2001 | Marsden ................ 285/210 |
| 6,189,937 | B1 | * | 2/2001 | Brandel ................ 285/210 |
| 6,712,544 | B2 | | 3/2004 | Krüger et al. |
| 2002/0159829 | A1 | | 10/2002 | Kruger et al. |
| 2011/0232335 | A1 | * | 9/2011 | Johnson et al. ................ 285/208 |

FOREIGN PATENT DOCUMENTS

| | | |
|---|---|---|
| DE | 103 32 035 A1 | 2/2004 |
| DE | 20 2005 007 846 U1 | 10/2006 |
| EP | 0 496 356 A1 | 7/1992 |
| EP | 1 688 655 A1 | 8/2006 |
| KR | 20020076282 A | 10/2002 |
| WO | 2004/070250 A1 | 8/2004 |

* cited by examiner

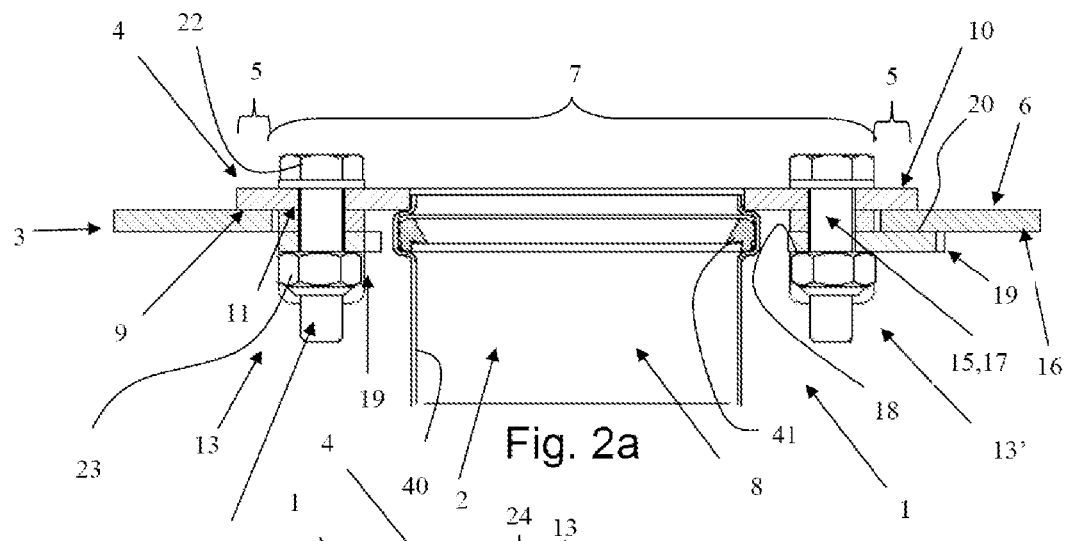
Fig. 2a
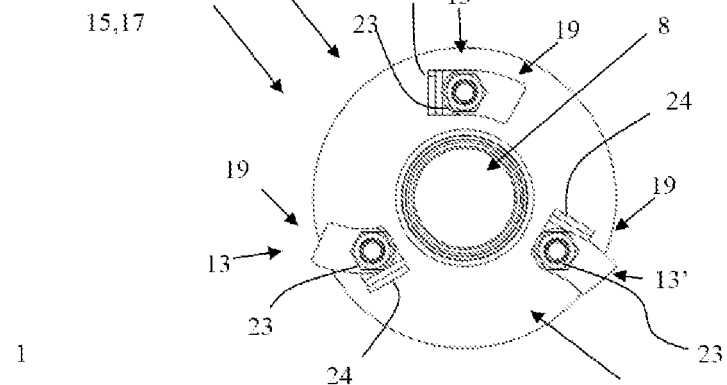
Fig. 2b
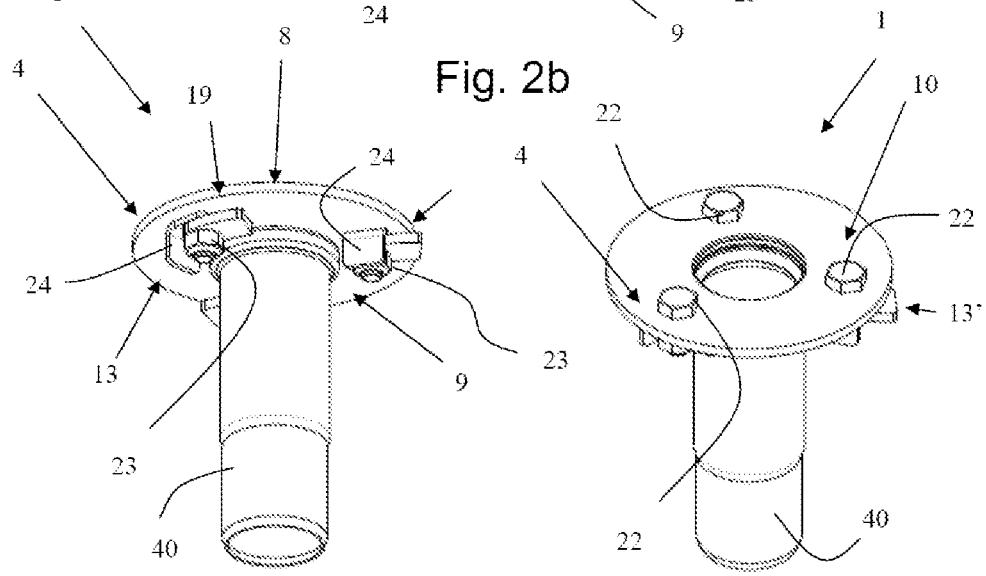
Fig. 2c
Fig. 2d

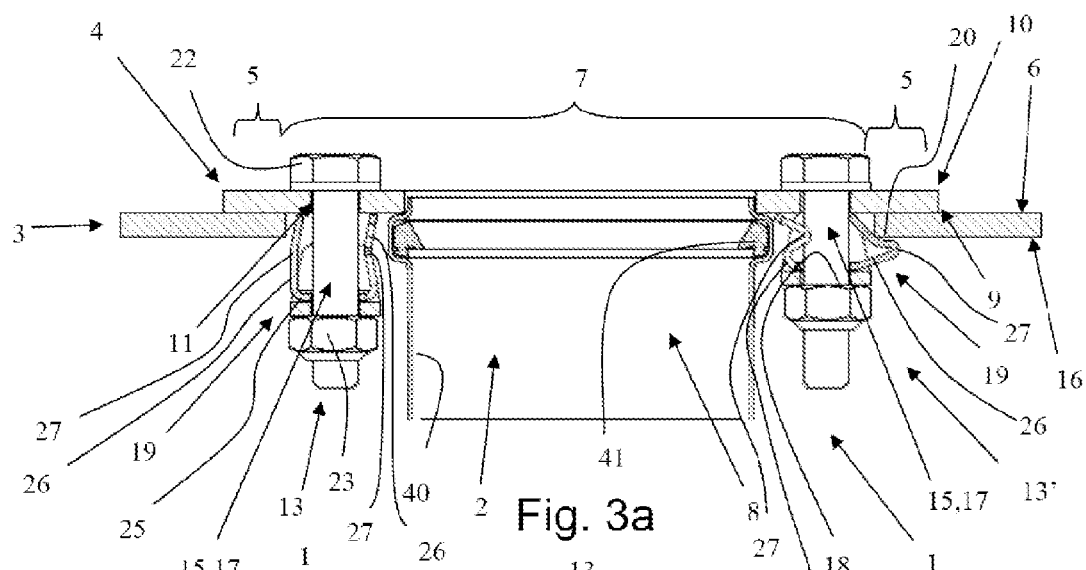
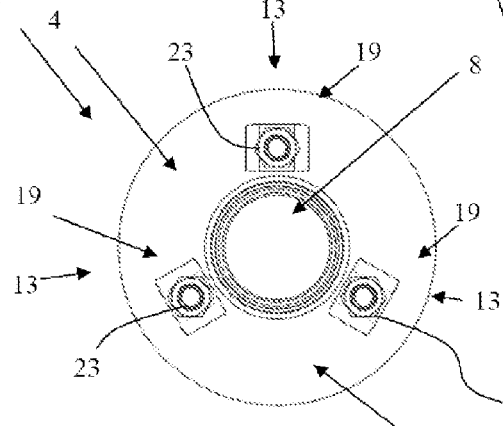
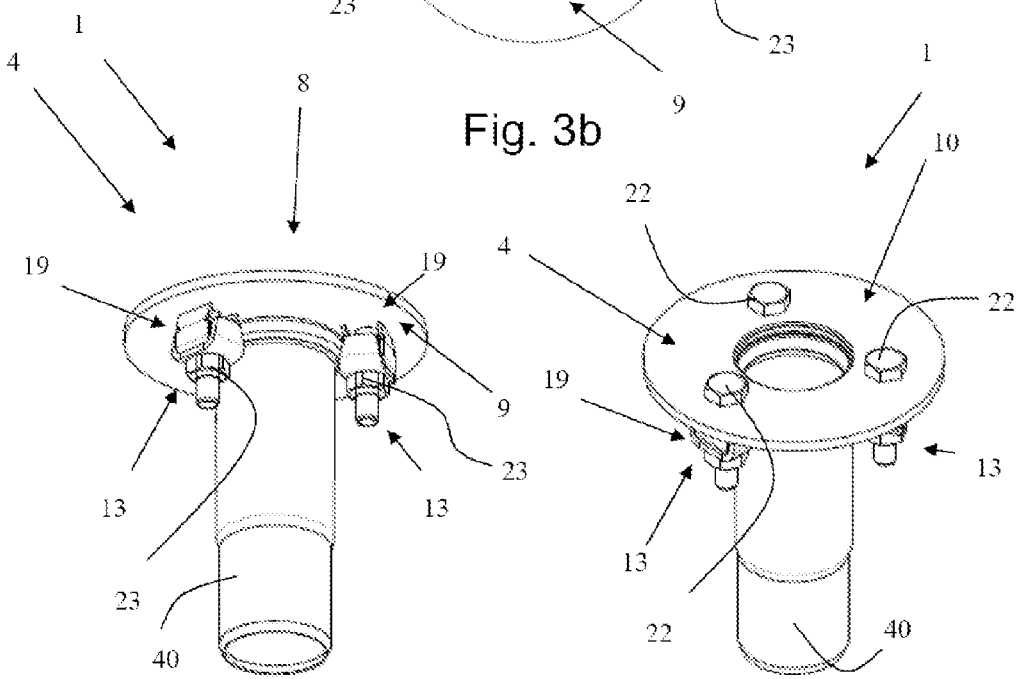
Fig. 3a
Fig. 3b
Fig. 3c
Fig. 3d

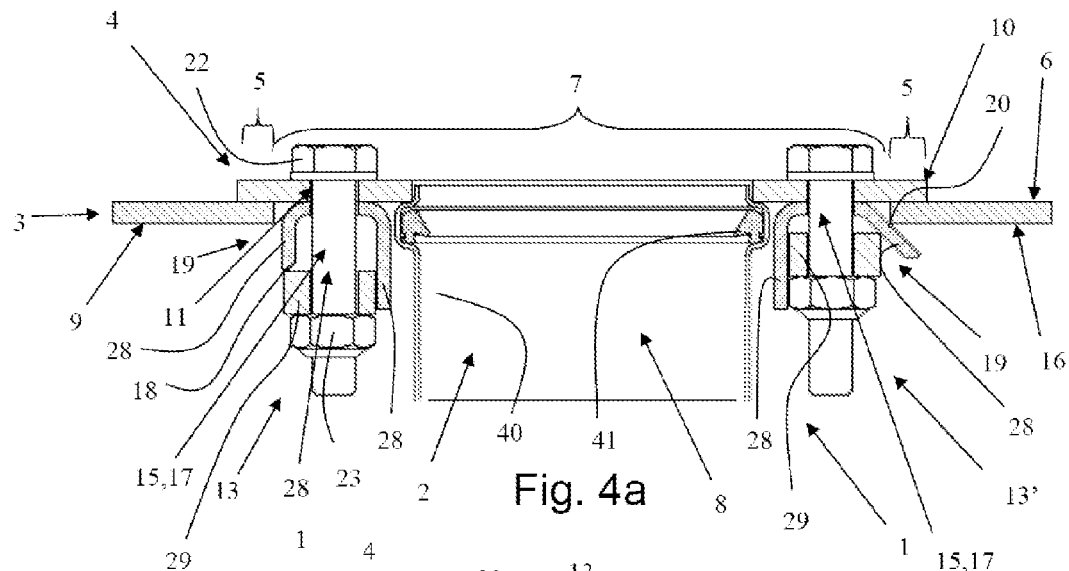
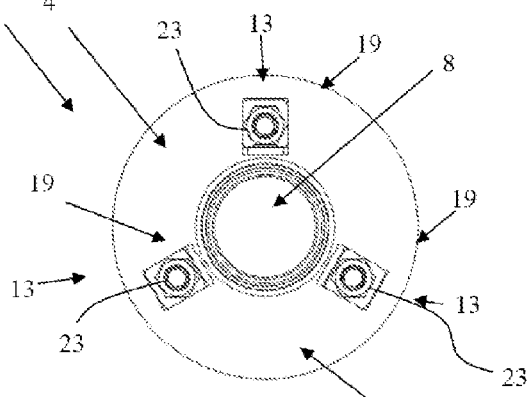
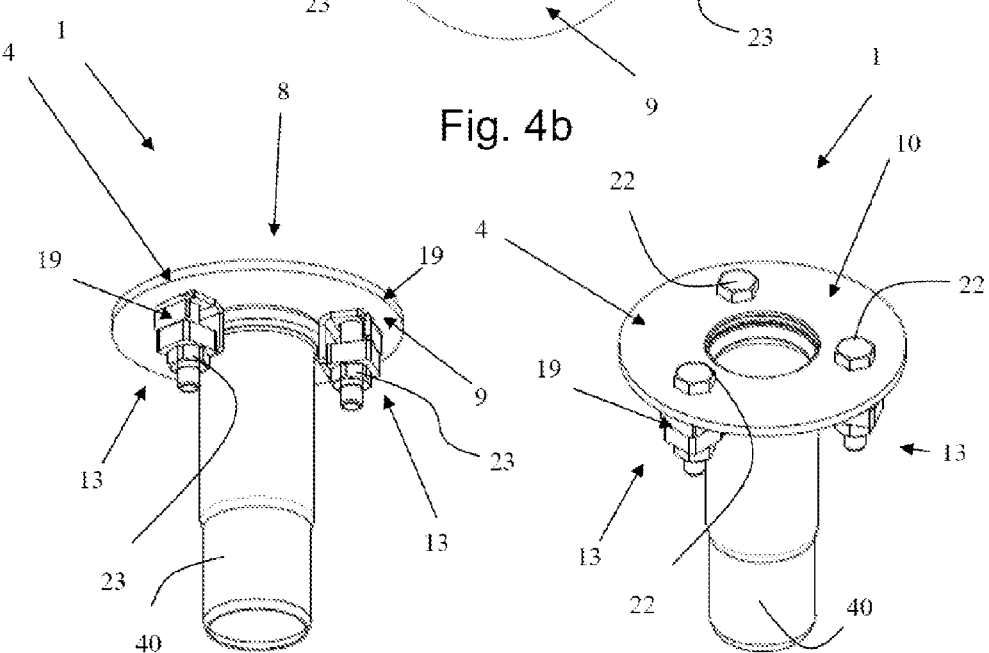
Fig. 4a
Fig. 4b
Fig. 4c
Fig. 4d

DUCTWORK

FIELD OF THE INVENTION

The present invention concerns a ductwork for leading at least one pipe through an opening in a partitioning, including a flange with an outer periphery area and a central area which is designed with a guide opening for every pipe, the flange being provided with a number of mounting apertures, the flange having an inner side and an outer side opposite the inner side, where the inner side is adapted for bearing against one side of the partitioning.

BACKGROUND OF THE INVENTION

Ductwork, or lead-ins, are particularly used onboard ships where a pipe is to pass through the partitioning from one compartment to the next compartment. The partitioning can both be the vertically oriented walls separating individual compartments on a deck and the horizontally oriented partitionings separating individual decks.

Ductwork made of metal may e.g. be fastened to the partitioning by welding, on the condition that both parts are made of a weldable metal. This technology has been used for many years as the ductwork can be established from one side. This is an essential advantage, particularly by ductwork between partitionings between decks as it is not required with a fitter at each side of the partitioning. However, mounting by welding implies several disadvantages where the most important is the fire hazard. It is not an infrequent incident that a great number of larger or smaller fires occur during the construction of ships with ductworks, as sparks from the welding may easily ignite e.g. packing, auxiliary materials and equipment in the vicinity of the mounting site.

DE 20 2005 007 846 U1 describes a ductwork for leading a pipe through a boring in a partitioning. The ductwork includes a flange bearing against a partitioning, a clamping means with a fixing device and a bolt with a nut. The bolt bears against one side of the flange. It has been passed through an opening in the flange, an opening in the clamping means and an opening in the fixing device. The nut is screwed on the bolt and bears against the fixing device. The fixing device is a rod which is inclining abutment against the clamping means which bears against the flange. By rotating the nut on the bolt, the fixing device is brought into a more upright position. Hereby is achieved engagement with the internal side of the boring as the fixing device reaches a greater diameter. The single ductwork in DE 20 2005 007 846 U1 only fits borings with limited diameter range as the widening of the diameter of the fixing devices is limited. Moreover, the flange cannot be mounted from one side of the partitioning. It is necessary to have access to both sides.

OBJECT OF THE INVENTION

It is the object of the invention to indicate a ductwork or lead-in which can be mounted without welding and which can be mounted from one side of the partitioning.

DESCRIPTION OF THE INVENTION

According to the present invention, this is achieved by a ductwork for leading at least one pipe through an opening in a partitioning, including a flange with an outer periphery area and a central area which is designed with a guide opening for every pipe, the flange being provided with a number of mounting apertures, the flange having an inner side and an outer side opposite the inner side, where the inner side is adapted for bearing against one side of the partitioning, wherein the ductwork is peculiar in that the ductwork further includes a connecting arrangement mounted in each mounting aperture, the connecting arrangement including a force transmission means with an operating member disposed over the outer side of the flange, and with a shank extending through the mounting aperture, a clamping means disposed on the shank of the force transmission means and which is displaceable around and/or along the shank by actuating the operating member, and an engagement arrangement disposed between the inner side of the flange and the clamping means, and which is adapted with contact surfaces interacting with contact surfaces on the clamping means, and engagement faces that may be displaced radially relative to the orientation of the shank by actuating the operating member such that the flange and the engagement arrangement squeeze around the partitioning via the engagement faces.

Hereby, the ductwork can be mounted and secured on the partitioning without welding and by mounting from the side of the partitioning where the connecting arrangement of the flange is provided with an operating member.

In the present application, the term "partitioning" is used both for vertically oriented partitionings between adjacent compartments, and horizontally oriented partitionings, e.g. floors, ceilings or decks.

The pipe can be a pipe extending through a plurality of partitionings, e.g. a water supply pipe. Furthermore, the pipe can be a pipe extending through one partitioning, e.g. a floor drain.

The partitioning is provided with an opening for the pipe. The size of the opening is adapted to the size of the flange which in turn is determined by the number and size of the at least one pipe. The opening is adapted such that the outer periphery area overlaps the partitioning and so that the clearance corresponds to the central area. As mentioned above, the flange is provided with an outer periphery area and a central area with a passage opening for every pipe. The flange has an inner side and an outer side separated by the material thickness of the flange. The flange is mounted with the inner side bearing against the partitioning and the outer side facing the compartment.

The flange is provided with a number of mounting apertures in each of which is mounted a connecting arrangement. The connecting arrangement can be mounted in the mounting aperture simultaneously with or prior to mounting the flange.

The number of mounting apertures and connecting arrangements may e.g. be two, three, four, five, six or more, but will preferably be more than two. The mounting apertures are distributed such that they, when the flange is mounted over the opening in the partitioning, are evenly distributed around the opening. An evenly distributed strength of the joint between flange and partitioning is hereby ensured.

The connecting arrangement includes a force transmission means, a clamping means and an engagement means.

The force transmission means has an operating member and a shank. The operating member is disposed over the outer side of the flange such that it can be operated from the outer side of the flange. The shank extends through the mounting aperture. Moreover, the connecting arrangement includes a clamping means.

The clamping means is disposed on the shank of the force transmission means and is displaceable along the shank when the operating member is actuated.

The engagement arrangement is disposed between the inner side of the flange and the clamping means. The engagement arrangement and the clamping means have interacting contact faces. The engagement means may furthermore be with contact with the flange or without contact with the flange. The engagement arrangement has engagement faces that can be displaced radially relative to the orientation of the shank.

When the operating member is actuated so that the clamping means moves towards the inner side of the flange, the clamping means will actuate the engagement arrangement such that the engagement faces are displaced radially relative to the orientation of the shank. By continued displacement, the engagement faces come into contact with the other side of the partitioning, opposite the first side against which the flange bears.

The operating member is actuated by a force which by stemming against the flange is transmitted through the shank, further through the clamping means and via the interacting contact faces of the clamping means and the engagement arrangement through the engagement arrangement to the engagement faces. The flange and the engagement arrangement will thereby via the engagement faces squeeze around the partitioning and thereby secure the ductwork.

In an advantageous embodiment according to the invention, the connecting arrangement is a blind rivet. The engagement arrangement is formed in the shank of the force transmission means during mounting. The operating member is loose and is used during mounting. The shank is hollow with the clamping means provided in the shank as an element which is partly released during mounting (pop rivet) or a threaded element interacting with a internal thread in the shank. The operating member is connected to the clamping means and pulls it such that it is displaced along the shank and together with the latter. The operating member has fixed support against the part of the shank closest to the flange. During this operation, the shank is deformed such that the engagement arrangement is formed by a bead at the outer side of the shank with engagement faces bearing against the other side of the partitioning.

This is a particularly simple way of achieving unilateral fastening of the ductwork. The fastening is permanent as the ductwork can only be removed by a destructive operation.

The mounting apertures in the above described embodiment are formed in the outer periphery area. Before mounting the connecting arrangements, there is to be provided boring through the partitioning opposite each mounting aperture.

According to a further embodiment, the ductwork according to the invention is peculiar in that the mounting apertures are formed in the central area and that the engagement faces are displaced outside the periphery of the central area by actuating the operating member.

The connecting arrangement can hereby be established so that it can be secured with the flange before mounting, and with greater tolerance. The part of the connecting arrangements located at the inner side of the flange can be lead through the opening in the partitioning. Hereby it becomes possible to establish the opening in the partitioning with a size so that there is a certain distance to the connecting arrangements such that the ductwork can be positioned with a certain tolerance.

According to a further embodiment, the ductwork according to the invention is peculiar in that the shank and the clamping means are provided with interacting screw threads.

Hereby, a particularly simple way of transmitting the forces from the operating member to the clamping means is achieved. Moreover, the pitch of the screw thread can be chosen so that large forces can be transmitted with a relatively small action of force on the operating member. The operating member is to be moved more in order to attain the same displacement as compared with a screw thread having greater pitch.

According to a further embodiment, the ductwork according to the invention is peculiar in that the contact surfaces of the clamping means and/or the engagement means are inclining.

The force vector from the clamping means to the engagement arrangement is hereby provided an angle such that it is not directed in parallel with the longitudinal direction of the force transmission means. The engagement faces may hereby transmit forces perpendicularly to and in parallel with the partitioning. Moreover, the ductwork can be self-centering in the opening in the partitioning.

According to a further embodiment, the ductwork according to the invention is peculiar in that the engagement arrangement includes a pivot arm provided with engagement faces and contact faces, that the contact faces of the engagement arrangement are interacting with the contact faces of the clamping means to provide fixed or frictional connection for transmitting torque from the clamping means to the pivot arm, and that the pivot arm is displaceable from a free position with the engagement means within the periphery of the central area and with an engagement position with the engagement means outside the periphery of the central area.

Hereby is achieved that the ductwork can be mounted in a non-permanent configuration. The pivot arm is pivoted out into the engagement position outside the periphery of the central area, and by continued actuation of the operating member the pivot arm is displaced until contact between the engagement faces and the partitioning is achieved, after which further actuation of the operating member will result in an increased action of force between the engagement faces and the partitioning.

According to a further embodiment, the ductwork according to the invention is peculiar in that the engagement arrangement includes a stop and that the pivot arm has an abutment on the stop in the engagement position.

Hereby is achieved a mounting which is easy to perform for the fitter. The ductwork is positioned in the opening in the partitioning after which the operating member is actuated, after which the pivot arm with engagement faces pivots out against the stop and then engages the partitioning. This can be done by a continuous actuation of the operating member.

The force transmission means can e.g. be a bolt where the operating members are the bolt head and the shank is the threaded body of the bolt. The clamping means can e.g. be a nut which is welded to the pivot arm. The fitter positions the ductwork in the opening and screws on the bolt head with a screw tool, for example a screwgun. The pivot arm will pivot against the stop under the action of the friction between the bolt and the nut. By continued actuation, the pivot arm with engagement faces will be displaced until they engage the partitioning. By using a screwgun with torque control, it will automatically be shut off when the desired prestressing force between the ductwork and the partitioning is achieved.

By actuating the operating unit in opposite direction by mounting, the pivot arm will be released and pivot away from the outer periphery area such that the ductwork can be dismounted.

According to a further embodiment, the ductwork according to the invention is peculiar in that the shank of the force transmission means is hollow and provided with an internal screw thread, that the clamping means includes a bolt with a shank extending through the hollow shank and through the mounting aperture, that the pivot arm is secured to the shank of the bolt and that a direction indicator is formed at the end of the bolt for indicating the position of the pivot arm. Hereby, correct determination of direction for the pivot arm is ensured. As the bolt end is visible for a fitter, by mounting it can be ensured that the pivot arm is disposed correctly with its engagement face opposite the other side of the partitioning. There will preferably be a screw thread engagement between the hollow shank and the bolt shank.

According to a further embodiment, the ductwork according to the invention is peculiar in that the engagement arrangement includes a stop, that the pivot arm has an abutment against the stop in the engagement position, and that at the end of the stop farthest from the flange there is provided a support plate which is largely in parallel with the flange and has a passage opening for receiving and retaining the bolt, as the bolt head is located at one side of the plate and the pivot arm at the other side of the support plate. With a support plate it is ensured that the pivot arm does not fall out even during mounting. Even in a situation where a fitter screws the clamping means in the wrong direction, the bolt will remain on the support plate as the pivot arm and the bolt head are located at each their side of the support plate. This may be of particular significance if the ductwork is to be disposed in a partitioning in the form of a storey partition as the pivot arm then can be very difficult to acquire again.

According to a further embodiment, the ductwork according to the invention is peculiar in that before and during mounting, the pivot arm is fastened to the support plate with an adhesive, preferably Loctite™. Temporary locking of bolt and pivot arm is hereby achieved. This ensures that the pivot arm is retained in its proper position. By mounting the ductwork it is ensured that the pivot arm is disposed within the periphery of the opening in the partitioning.

Moreover, it is possible to apply an adhesive, preferably Loctite™, between the bolt shank and the hollow interior of the force transmission means. Hereby is ensured that the pivot arm will follow when the clamping means is screwed in direction towards the engagement.

According to a further embodiment, the ductwork according to the invention is peculiar in that the engagement arrangement includes a U-shaped brace with the opening of the U facing the clamping means, and where the distance between the legs of the U is less than the width of the clamping means.

Hereby is achieved a simple mounting of the ductwork. By displacing the clamping means, the clamping means will displace the legs of the U outwardly and penetrate in between the legs of the U as at least one of the contact faces between the clamping means and the engagement arrangement is inclining. The brace can be adapted such that one or both legs are displaced outwardly. By further displacement, the outermost leg of the U with an engagement face will engage the partitioning.

The brace can be adapted for permanent deformation in that the clamping means is deformed so that the yield strength of the brace material is exceeded, or non-permanent deformation by avoiding that the deformation of the brace by the clamping means exceeds the yield strength of the brace material.

Permanent deformation is used when desiring permanent mounting. Non-permanent deformation is used it is desired to be able to dismount the ductwork.

A suitable brace material when non-permanent deformation is desired is spring steel.

According to a further embodiment, the ductwork according to the invention is peculiar in that the engagement arrangement includes a U-shaped brace with the bottom of the U facing the clamping means, and where the legs of the U are permanently deformed by displacement of the engagement faces.

Hereby is achieved a simple mounting which is permanent.

According to a further embodiment, the ductwork according to the invention is peculiar in that the legs of the U are designed with at least one narrowed cross-sectional area for forming a deformation zone.

Hereby is achieved that the brace has predefined deformation zones. It is hereby possible to control where the engagement faces are established. Moreover, the cross-sectional constrictions can be designed so that inadvertent crack formation is avoided.

Alternatively, the cross-sectional constrictions can be combined with or replaced by prebent bending lines or similar weakenings of the material.

According to a further embodiment, the ductwork according to the invention is peculiar in that the engagement arrangement includes an L-shaped angle where contact faces are formed on the foot of the L, where inclining engagement faces are formed on the legs of the L, where the flange includes a guide rising from the inner side with an inclining guide surface, and where the guide surface is in contact with the engagement face during part of the radial displacement.

In this embodiment of the invention, a great force can be transmitted to the partitioning.

According to a further embodiment, the ductwork according to the invention is peculiar in that the L-shaped angle is connected with L-shaped angles in adjacent connecting arrangements.

Hereby, the ductwork can be made with a continuous common engagement arrangement.

In a particular embodiment, the engagement arrangement is designed as a cup with openings opposite the mounting apertures.

According to a further embodiment, the ductwork according to the invention is peculiar in that the connecting arrangement includes a housing, that the clamping means is a wedge, that the engagement arrangement is a wedge, and that the clamping means and the engagement arrangement are arranged in the housing.

Hereby is achieved that the ductwork becomes self-centering with ample retention, both in direction at right angles to the partitioning and a direction in parallel with the partitioning.

According to a further embodiment, the ductwork according to the invention is peculiar in that the guide opening is formed with a collar or a guide tube which is fastened to the flange.

Hereby is achieved a secure guiding of the pipe.

According to a further embodiment, the ductwork according to the invention is peculiar in that the collar or the guide tube are provided with at least one internal pipe packing for sealing against the at least one pipe.

A tight connection between the flange and the pipe is hereby achieved.

According to a further embodiment, the ductwork according to the invention is peculiar in that the ductwork includes a flange packing disposed within the outer peripheral area for sealing against the partitioning.

In an alternative embodiment according to the invention, the connecting arrangement is provided with a longitudinal stop for arresting the longitudinal displacement of the clamping means.

Since the displacement of the clamping means is limited, the stress that may be attained will be limited to a predefined maximum value. By actuating the operating member until it is completely secured, a fitter can be certain that the tightening wanted by the engineer is attained. Hereby, the risk of the ductwork coming loose is reduced.

DESCRIPTION OF THE DRAWING

The invention will now be explained more closely with reference to the accompanying drawing, where:

FIG. 2a shows a cross-section of a ductwork in a second embodiment;

FIG. 2b shows a plan view of the ductwork shown in FIG. 2a, as seen from the inner side of the flange;

FIG. 2c shows an isometric view of the ductwork in FIG. 2a;

FIG. 2d shows a second isometric view of the ductwork in FIG. 2a;

FIG. 3a shows a cross-section of a ductwork in a third embodiment;

FIG. 3b shows a plan view of the ductwork shown in FIG. 3a, as seen from the inner side of the flange;

FIG. 3c shows an isometric view of the ductwork in FIG. 3a;

FIG. 3d shows a second isometric view of the ductwork in FIG. 3a;

FIG. 4a shows a cross-section of a ductwork in a fourth embodiment;

FIG. 4b shows a plan view of the ductwork shown in FIG. 4a, as seen from the inner side of the flange;

FIG. 4c shows an isometric view of the ductwork in FIG. 4a;

FIG. 4d shows a second isometric view of the ductwork in FIG. 4a;

FIG. 7b shows a second isometric view of the ductwork in FIG. 7a;

FIG. 7c shows a further isometric view of the ductwork in FIG. 7a;

FIG. 8b shows a second isometric view of the group ductwork in FIG. 8a.

In the explanation of the Figures, identical or corresponding elements will be provided with the same designations in different Figures. Therefore, no explanation of all details will be given in connection with each single Figure/embodiment.

DETAILED DESCRIPTION OF THE INVENTION

Figure 1:
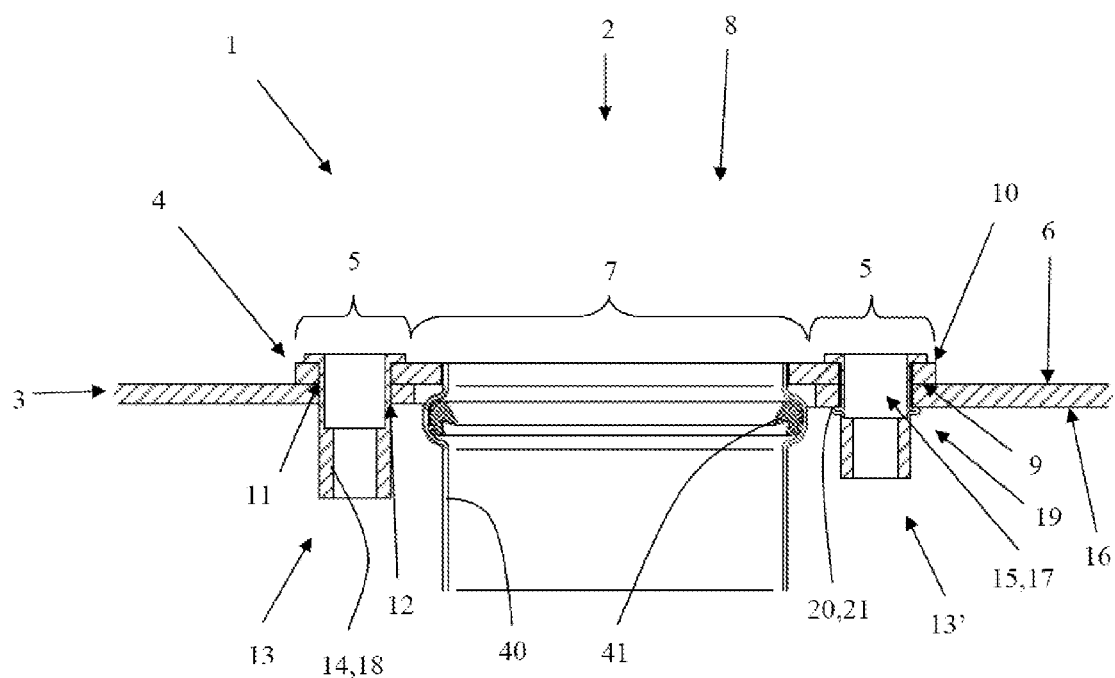
FIG. 1 shows a cross-section of a ductwork in a first embodiment.

FIG. 1 shows a cross-section of a ductwork 1 in a first embodiment.

In the first embodiment, the ductwork 1 is cylindric. The ductwork 1 can have any other shape, e.g. quadratic, oval, polygonal, elliptic or a combination of the said shapes. Ductworks 1 with other shape than cylindric are used e.g. in connection with group ductworks where the ductwork 1 is used for leading in several pipes.

The ductwork 1 is shown mounted in an opening 2 in a partitioning 3. The ductwork 1 includes a flange 4 with an outer periphery area 5 which bears against one side 6 of the partitioning and with a central area 7 provided with a guide opening 8. The guide opening 8 is adapted for receiving a pipe which can be passed through the ductwork 1.

The flange 4 has an inner side 9 facing the partitioning 3, and an outer side 10 opposite the inner side 9.

The flange 4 is provided with a number of mounting apertures 11. In the shown embodiment, the mounting apertures 11 are arranged in the outer periphery area 5. The partitioning 3 is provided with other mounting apertures 12 opposite the mounting apertures 11 of the flange.

The ductwork 1 includes a connecting arrangement 13 mounted in each mounting aperture 11. The connecting arrangement 13 at the left side of the Figure is shown not fastened before being actuated by an operating member (not shown). The connecting arrangement 13' at the right side of the Figure is shown fastened after being actuated by an operating member (not shown).

In the shown embodiment, the connecting arrangement 13 is a blind rivet provided with a screw thread 14. The blind rivet has a force transmission means 15 which, when the blind rivet is fastened, transmits a prestressing force from the outer side 10 of the flange to the other side 16 of the partitioning. The force transmission means 15 has a shank 17 extending through the mounting aperture 10 and which is hollow. A clamping means (not shown) disposed in the shank 17 during fastening of the blind rivet is adapted with contact faces 18 interacting with contact faces 18 on an engagement arrangement 19 during fastening of the blind rivet. The clamping means (not shown) is displaced along the shank 17 during actuation of an operating member (not shown) which is a device used for installing blind rivets. The clamping means (not shown) pulls the engagement arrangement 19, forming engagement faces 20 during deformation as part of the engagement arrangement 19 is displaced radially relative to the orientation of the shank. A bead 21 is formed with engagement surfaces 20 bearing on the other side 16 of the partitioning.

FIGS. 2a-d show a ductwork 1 in a second embodiment.

The ductwork 1 is shown mounted in an opening 2 in a partitioning 3. The ductwork 1 includes a flange 4 with an outer periphery area 5 which bears against one side 6 of the partitioning, and with a central area 7 provided with a guide opening 8 and a number of mounting apertures 11. The guide opening 8 is adapted for receiving a pipe which can be passed through the ductwork 1. Each mounting aperture 11 is adapted for receiving a connecting arrangement 13.

The flange 4 has an inner side 9 facing the partitioning 3, and an outer side 10 opposite the inner side 9.

The connecting arrangement 13 at the left side of FIG. 2a is shown not fastened before being actuated by an operating member 22. The connecting arrangement 13' at the right side of the Figure is shown fastened after being actuated by the operating member 22.

The connecting arrangement 13 includes a force transmission means 15 in the form of a bolt with a head forming an operating member 22 which is located over the outer side 10 of the flange. The shank 17 of the bolt extends through the mounting aperture 11. A clamping means 23 in the form of a nut is disposed on the shank 17 of the force transmission means. The shank 17 and the clamping means 23 are provided with interacting screw threads. The clamping means 23 is displaceable, at first around and then along the shank 17 by actuating the operating member 22. An engagement arrangement 19 in the form of a pivot arm is disposed between the inner side 9 of the flange and the clamping means 23. The pivot arm is adapted with contact faces 18 that interact with contact faces 18 on the clamping means 23. The pivot arm furthermore has engagement faces 20 that face the other side 16 of the partitioning, and which can be displaced radially outside the periphery of the central area by actuating the operating member 22.

On FIGS. 2b-c are shown various positions during displacement of the engagement faces 20 of the pivot arm. It appears from FIGS. 2b-c that the engagement arrangement 19 includes a stop 24. The clamping means 23 moves around the shank 17 until the pivot arm hits the stop 24. The clamping means 23 is then displaced along the shank 17 until the engagement faces 20 are in contact with the other side 16 of the partitioning. The second embodiment is a non-permanently fastened ductwork.

FIGS. 3a-d show a ductwork 1 in a third embodiment that differs from the second embodiment by having a different engagement arrangement 19.

The connecting arrangement 13 at the left side of FIG. 3a is shown not fastened before being actuated by an operating member 22. The connecting arrangement 13' at the right side of the Figure is shown fastened after being actuated by the operating member 22.

An engagement arrangement 19 in the form of a U-shaped brace is disposed between the inner side 9 of the flange and the clamping means 23. The bottom 25 of the U faces the clamping means 23. The legs 26 of the U are deformed permanently during displacement of the clamping means 23 against the inner side 9 of the flange 4.

The U-shaped brace is designed with a narrowed cross-sectional area 27 and for bending for formation of deformation zones.

The third embodiment is a permanently secured ductwork.

FIGS. 4a-d show a ductwork 1 in a fourth embodiment that differs from the second embodiment by having a different engagement arrangement 19.

The connecting arrangement 13 at the left side of FIG. 4a is shown not fastened before being actuated by an operating member 22. The connecting arrangement 13' at the right side of the Figure is shown fastened after being actuated by the operating member 22.

An engagement arrangement 19 in the form of a U-shaped brace is disposed between the inner side 9 of the flange and the clamping means 23. The opening 28 of the U faces the clamping means 23. One leg 26 of the U is then displaced outwardly when the clamping means 23 is displaced against the inner side 9 of the flange as the clamping means penetrates in between one leg 26 of the U assisted by an inclining contact face between the one leg 26 of the U and the clamping means 23, which in the shown embodiment is provided with an intermediate member 29. By further displacement, the one leg 26 of the U with an engagement face 20 will engage the other side 16 of the partitioning.

The fourth embodiment can be both a permanent and a non-permanent securing of the ductwork 1, respectively.

Figure 5:
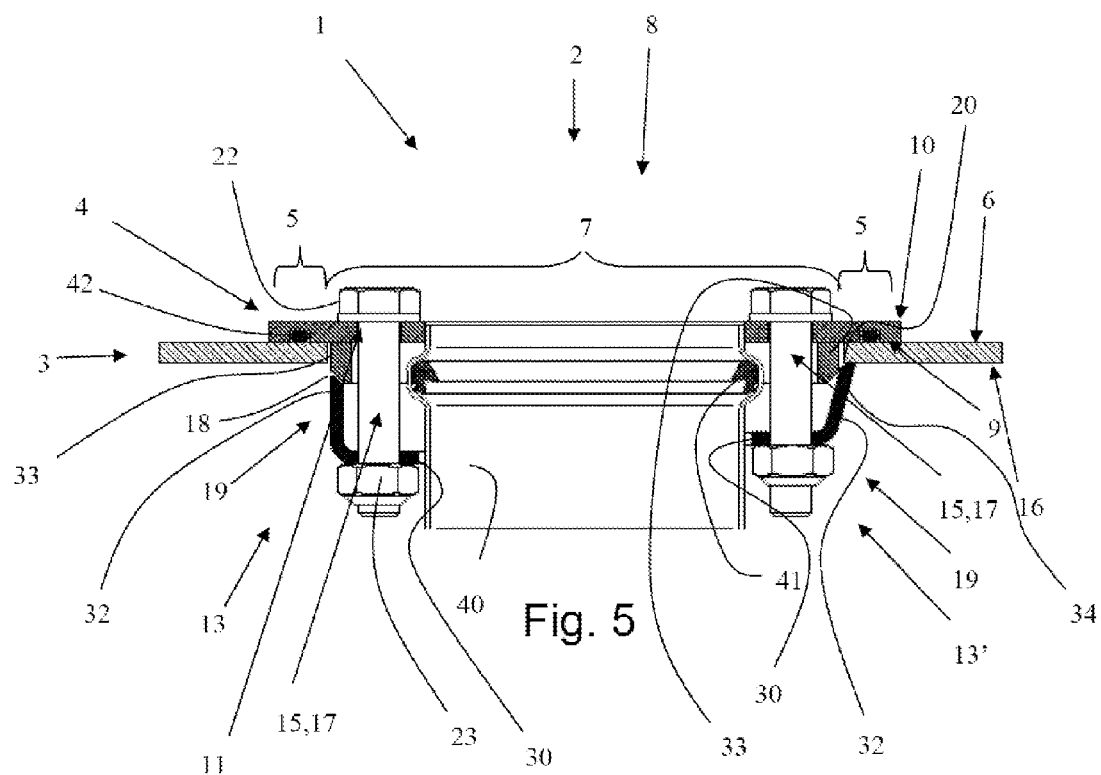
FIG. 5 shows a cross-section of a ductwork in a fifth embodiment.

FIG. 5 shows a cross-section of a ductwork in a fifth embodiment that differs from the second embodiment by having a different engagement arrangement 19.

The connecting arrangement 13 at the left side of FIG. 5a is shown not fastened before being actuated by an operating member 22. The connecting arrangement 13' at the right side of the Figure is shown fastened after being actuated by the operating member 22.

The engagement arrangement 19 includes an L-shaped angle 30 where contact faces 18 are formed on the foot 31 of the L, where inclining engagement faces 20 are formed on the legs 32 of the L, where the flange 4 includes a guide 33 rising from the inner side 9 with an inclining guide surface 34, and where the guide surface 34 is in contact with the engagement face 20 during part of the radial displacement.

In the shown fifth embodiment, the L-shaped angle is connected with L-shaped angles in adjacent connecting arrangements 13 such that a cup is formed, integrating all connecting arrangements 13 into one unit.

The fifth embodiment will be a permanent fastening of the ductwork 1.

Figure 6:
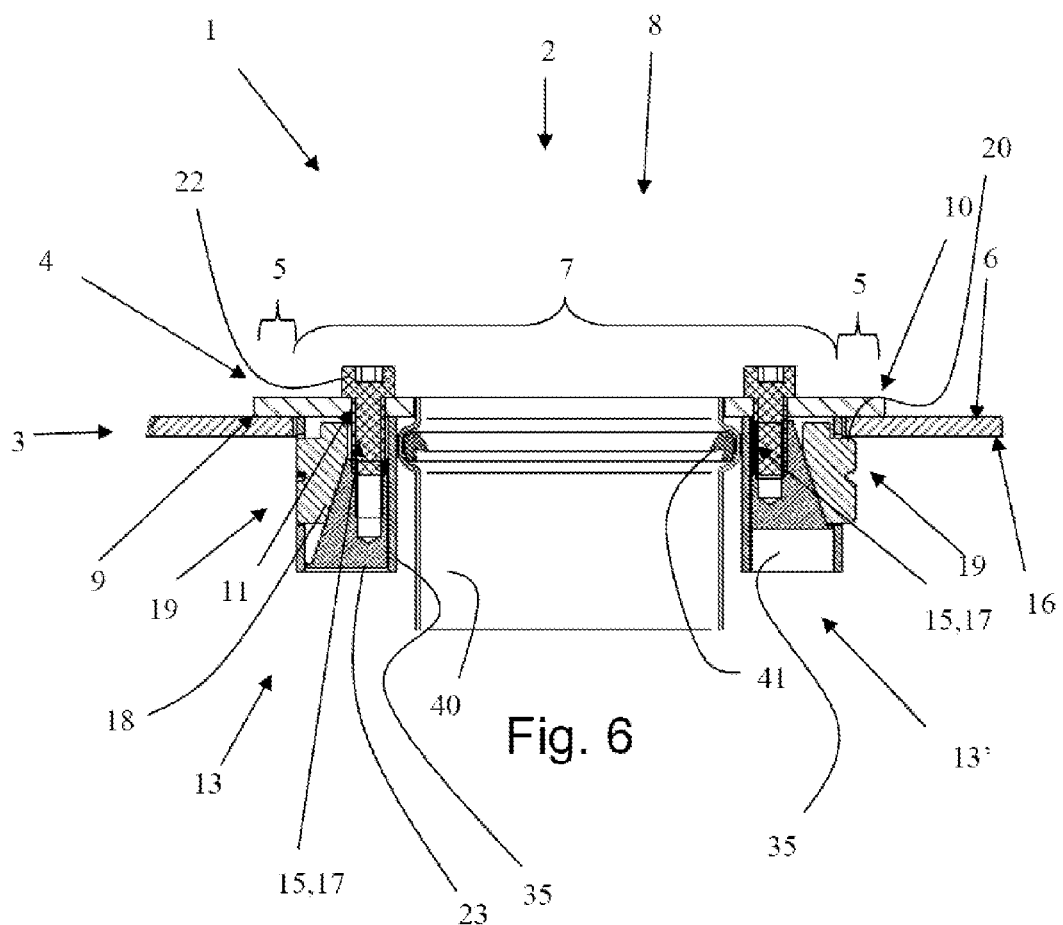
FIG. 6 shows a cross-section of a ductwork in a sixth embodiment.

FIG. 6 shows a cross-section of a ductwork in a sixth embodiment that differs from the second embodiment by having a different engagement arrangement 19.

The connecting arrangement 13 at the left side of FIG. 6a is shown not fastened before being actuated by an operating member 22. The connecting arrangement 13' at the right side of the Figure is shown fastened after being actuated by the operating member 22.

The engagement arrangement 19 includes a housing 35 forming a guide for the clamping means 23 and the engagement arrangement 19. The clamping means 23 and the engagement arrangement 19 are both wedge-shaped. The widest part of the clamping means 23 is farthest from the inner side 9 of the flange and the widest part of the engagement arrangement 19 is closest to the inner side 9 of the flange. When the clamping means 23 is displaced towards the inner side 9 of the flange along the shank 17, the engagement arrangement 19 and the engagement faces 20 of the engagement arrangement are forced radially outwards and in towards the other side 16 of the partitioning under the interacting inclining contact faces 18 of the clamping means 23 and the engagement arrangement 19, respectively.

The sixth embodiment will be a non-permanent fastening of the ductwork 1.

Figure 7A:
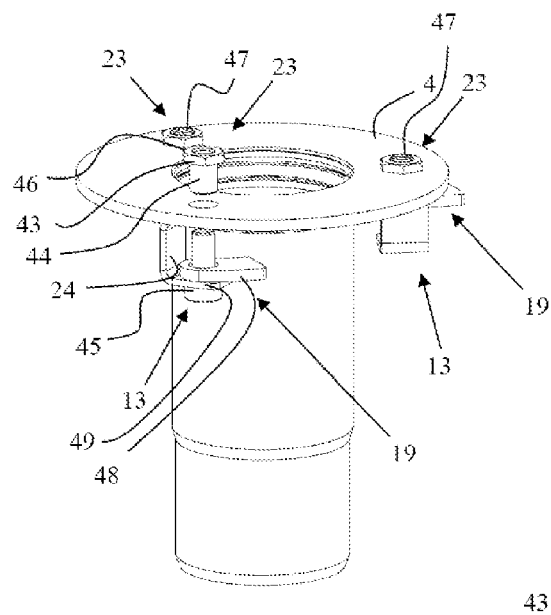
FIG. 7a shows an isometric view of a ductwork in a seventh embodiment.
Figure 7B:
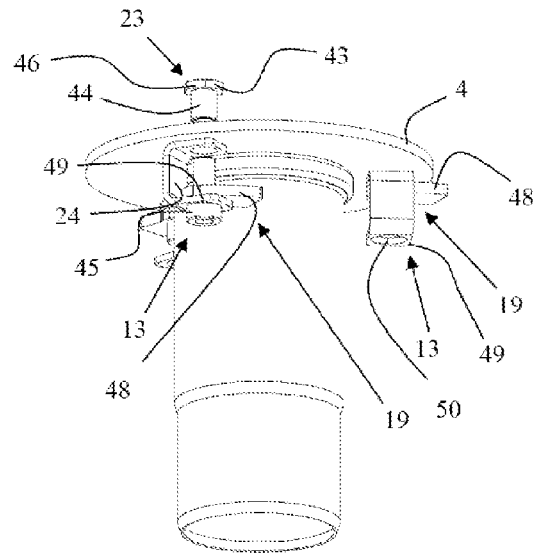
Figure 7C:
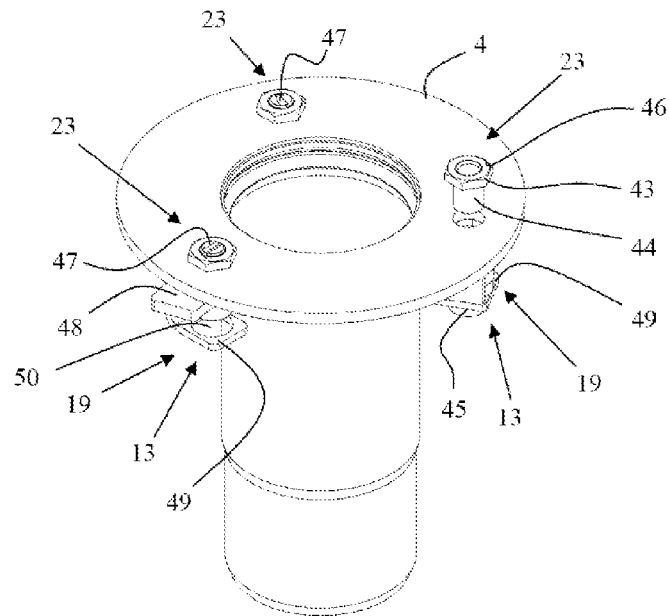

FIGS. 7a-c show a ductwork 1 in a seventh embodiment that differs from the second embodiment by having a different engagement arrangement 19.

It is here shown with a clamping means 23 in the form of a nut 42 which is connected with a hollow threaded shank 44. A bolt 45 interacts with the clamping means and extends in mounted condition through the hollow interior such that the free end 46 is visible at one side 6 of the partitioning. A direction indicator 47 in the form of a notch is formed at the free end 46, thus providing indication of the orientation of the pivot arm 48 which is fastened to the shank of the bolt 45 by means of Loctite™ or other adhesive. This indication will provide the fitter with visual certainty for correct positioning of the pivot arm during mounting as well as by fastening.

At its end farthest from the flange 4, the stop 24 is bent for forming a support plate 49 which is provided with a passage opening 50 for the bolt 45. The head of the bolt 45 is situated under the support plate and the fastened pivot arm 48 is situated above the support plate such that the bolt 45 is disposed in correct position for interacting with the clamping means 23. By screwing tight, the head of the bolt 45 can pass through the passage opening 50 as it clearly appears on FIG. 7c. The bolt head hereby presses the pivot arm upwards for bearing against the other side 16 of the portioning as illustrated in FIG. 2a.

As an adhesive is also used between the pivot arm 48 and the support plate 49, the pivot arm will be retained in the position shown at the left in FIG. 7a during mounting. This ensures that it is not disposed in its engagement position during mounting of the ductwork in an opening.

The seventh embodiment will be a non-permanent fastening of the ductwork 1.

Figure 8A:
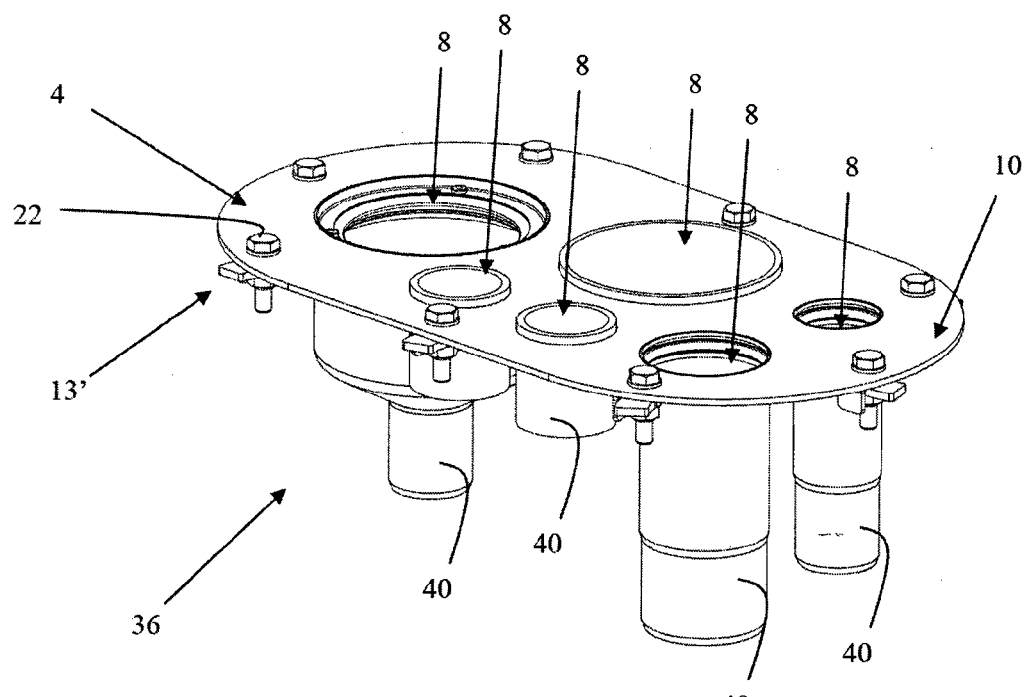
FIG. 8a shows an isometric view of a group ductwork.
Figure 8B:
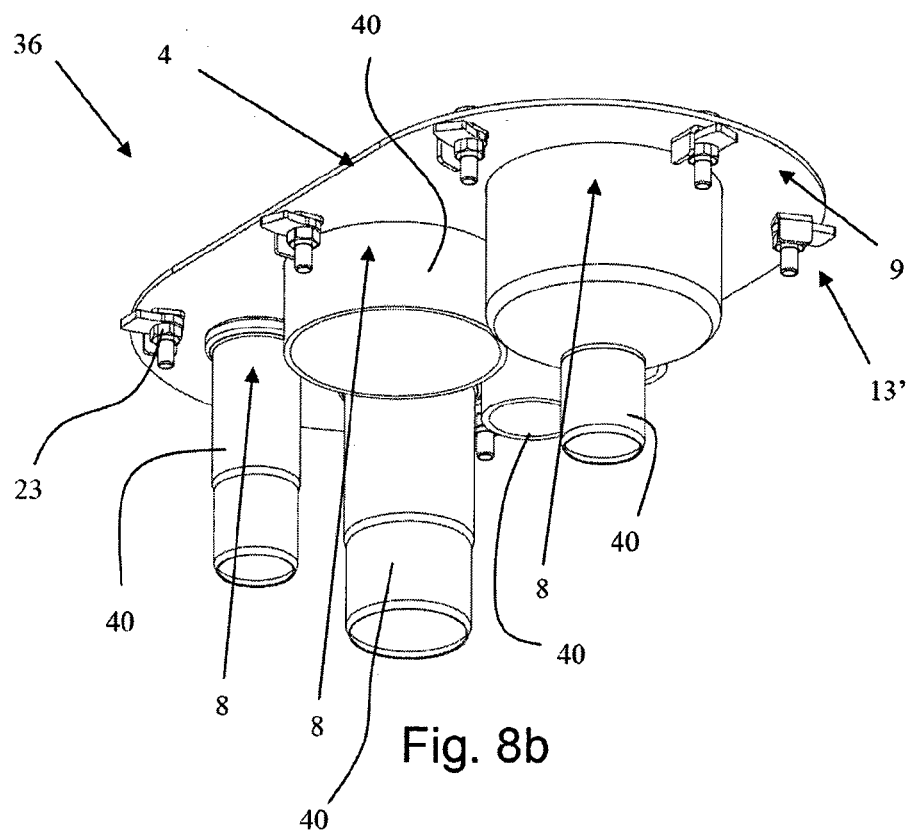

FIGS. 8a-b shows an isometric view of a group ductwork 36. In the shown embodiment of the group ductwork 36, the connecting arrangements 13 are shown in the second embodiment. Connecting arrangements 13 in the first, second, third, fourth, fifth or sixth embodiment are equally suited and can be combined if desired.

The flange 4 has an oval shape. The opening (not shown) in the partitioning (not shown) is designed such that it corresponds to the flange 4 in shape, but so that the outer peripheral area 5 of the flange 4 is in contact with the opening (not shown).

In the shown embodiments, the guide opening 8 is formed with a guide tube 40 which is fastened to the flange 4. The guide tube 40 is provided with an internal pipe packing 41 for sealing against the pipe.

The ductwork 1 furthermore includes a flange packing 42 disposed within the outer peripheral area 5 for sealing against the partitioning 3.

The invention claimed is:

1. A combination of a partitioning and a ductwork for leading at least one pipe through an opening in said partitioning, wherein said ductwork includes a flange with an outer periphery area and a central area which is provided with a guide opening for each of said at least one pipe, the flange being provided with a number of mounting apertures arranged in the outer periphery area, wherein the mounting apertures are formed in the central area, the flange having an inner side and an outer side opposite the inner side, where the inner side is adapted for bearing against one side of the partitioning, wherein the ductwork further includes a connecting arrangement mounted in each mounting aperture, the connecting arrangement including;
   a force transmission means with an operating member disposed over the outer side of the flange, and with a shank extending through the mounting aperture,
   a clamping means disposed on the shank of the force transmission means and which is displaceable around and/or along the shank by actuating the operating member, wherein the shank and the clamping means are provided with an interacting screw thread, and
   an engagement arrangement disposed between the inner side of the flange and the clamping means, wherein the engagement arrangement includes a pivot arm provided with engagement faces and contact faces, wherein the engagement faces may be displaced radially relative to the orientation of the shank, wherein the contact faces of the engagement arrangement are interacting with contact faces of the clamping means to provide fixed or frictional connection for transmitting torque from the clamping means to the pivot arm, and that the pivot arm is displaceable by rotation about the shank from a free position with the engagement faces within the periphery of the central area and with an engagement position with the engagement faces outside the periphery of the central area such that the engagement faces come into contact with the other side of the partitioning, wherein the contact faces of the clamping means and/or the contact faces of the engagement arrangement are inclining.

2. The combination according to claim 1, wherein the engagement arrangement includes a stop and that the pivot arm has an abutment on the stop in an engagement position.

3. A combination of a partitioning and a ductwork for leading at least one pipe through an opening in said partitioning, wherein said ductwork includes a flange with an outer periphery area and a central area which is provided with a guide opening for each of said at least one pipe, the flange being provided with a number of mounting apertures arranged in the outer periphery area, wherein the mounting apertures are formed in the central area, the flange having an inner side and an outer side opposite the inner side, where the inner side is adapted for bearing against one side of the partitioning, wherein the ductwork further includes a connecting arrangement mounted in each mounting aperture, the connecting arrangement including;
   a force transmission means with an operating member disposed over the outer side of the flange, and with a shank extending through the mounting aperture,
   a clamping means disposed on the shank of the force transmission means and which is displaceable around and/or along the shank by actuating the operating member, wherein the shank and the clamping means are provided with an interacting screw thread, and
   an engagement arrangement disposed between the inner side of the flange and the clamping means, wherein the engagement arrangement includes a pivot arm provided with engagement faces and contact faces, wherein the engagement faces may be displaced radially relative to the orientation of the shank, wherein the contact faces of the engagement arrangement are interacting with contact faces of the clamping means to provide fixed or frictional connection for transmitting torque from the clamping means to the pivot arm, and that the pivot arm is displaceable by rotation about the shank from a free position with the engagement faces within the periphery of the central area and with an engagement position with the engagement faces outside the periphery of the central area such that the engagement faces come into contact with the other side of the partitioning, wherein the shank of the force transmission means is hollow and provided with an internal screw thread, that the clamping means includes a bolt with a shank extending through the hollow shank and through the mounting aperture, that the pivot arm is secured to the shank of the bolt and that a direction indicator is formed at the end of the bolt for indicating the position of the pivot arm.

4. The combination according to claim 3, wherein the engagement arrangement includes a stop, that the pivot arm has an abutment against the stop in the engagement position, and that at the end of the stop farthest from the flange there is provided a support plate which is largely in parallel with the flange and has a passage opening for receiving and retaining the bolt, as the bolt head is located at one side of the plate and the pivot arm at the other side of the support plate.

5. The combination according to claim 3, wherein before and during mounting, the pivot arm is fastened to the support plate with an adhesive.

6. Ductwork The combination according to claim 1, wherein the guide opening is formed with a collar or a guide tube which is fastened to the flange.

7. The combination according to claim 1, wherein the ductwork includes a flange packing disposed within the outer peripheral area for sealing against the partitioning.

8. A ductwork for leading at least one pipe through an opening in a partitioning, including a flange with an outer periphery area and a central area which is provided with a circular guide opening for each of said at least one pipe, the flange being provided with a plurality of mounting apertures, wherein said mounting apertures are arranged at positions outside the circumference of said at circular guide opening, wherein the mounting apertures are formed in the central area, the flange having an inner side and an outer side opposite the inner side, where the inner side is adapted for bearing against one side of the partitioning, wherein the ductwork further includes a connecting arrangement mounted in each mounting aperture, the connecting arrangement including;

a force transmission means with an operating member disposed over the outer side of the flange, and with a shank extending through the mounting aperture, a clamping means disposed on the shank of the force transmission means and which is displaceable around and/or along the shank by actuating the operating member, wherein the shank and the clamping means are provided with an interacting screw thread, and an engagement arrangement disposed between the inner side of the flange and the clamping means, wherein the engagement arrangement includes a pivot arm provided with engagement faces and contact faces, wherein the engagement faces may be displaced radially relative to the orientation of the shank, wherein the contact faces of the engagement arrangement are interacting with contact faces of the clamping means to provide fixed or frictional connection for transmitting torque from the clamping means to the pivot arm, and that the pivot arm is displaceable by rotation about the shank from a free position with the engagement faces within the periphery of the central area and with an engagement position with the engagement faces outside the periphery of the central area such that the engagement faces come into contact with the other side of the partitioning, wherein the shank of the force transmission means is a hollow shank and has an internal screw thread, and wherein the clamping means includes a bolt with a shank extending through the hollow shank and through the mounting aperture, wherein the pivot arm is secured to the shank of the bolt, and wherein a direction indicator is formed at the end of the bolt for indicating the position of the pivot arm.

* * * * *